United States Patent
Berengoltz et al.

(10) Patent No.: US 9,436,840 B2
(45) Date of Patent: Sep. 6, 2016

(54) SYSTEM AND METHOD FOR SECURELY STORING INFORMATION

(75) Inventors: Pavel Berengoltz, Petah-Tikva (IL); Hay Hazama, Kiryat Ono (IL); Dani Polovets, Pardes Hana (IL)

(73) Assignee: SAFEND LTD., Tel Aviv (IL)

( * ) Notice: Subject to any disclaimer, the term of this patent is extended or adjusted under 35 U.S.C. 154(b) by 100 days.

(21) Appl. No.: 12/810,892

(22) PCT Filed: Dec. 25, 2008

(86) PCT No.: PCT/IL2008/001680
§ 371 (c)(1),
(2), (4) Date: Sep. 30, 2010

(87) PCT Pub. No.: WO2009/083970
PCT Pub. Date: Jul. 9, 2009

(65) Prior Publication Data
US 2011/0022849 A1    Jan. 27, 2011

Related U.S. Application Data

(60) Provisional application No. 61/016,855, filed on Dec. 27, 2007.

(51) Int. Cl.
*G06F 21/62*    (2013.01)

(52) U.S. Cl.
CPC ........... *G06F 21/6218* (2013.01); *G06F 21/62* (2013.01); *G06F 2221/2107* (2013.01); *G06F 2221/2143* (2013.01)

(58) Field of Classification Search
CPC ........ G06F 21/62; G06F 21/78; G06F 21/71; H04L 9/08
USPC .............................. 713/189; 726/27
See application file for complete search history.

(56) References Cited

U.S. PATENT DOCUMENTS

| | | | |
|---|---|---|---|
| 6,393,568 B1* | 5/2002 | Ranger et al. | 713/188 |
| 6,434,535 B1* | 8/2002 | Kupka et al. | 705/24 |
| 6,671,818 B1* | 12/2003 | Mikurak | 714/4.21 |
| 2003/0101140 A1* | 5/2003 | So et al. | 705/51 |
| 2005/0050332 A1* | 3/2005 | Serret-Avila et al. | 713/176 |
| 2006/0150257 A1 | 7/2006 | Leung et al. | |
| 2006/0232826 A1* | 10/2006 | Bar-El | 358/403 |
| 2006/0253445 A1* | 11/2006 | Huang | G06F 21/554 |
| 2007/0083939 A1 | 4/2007 | Fruhauf et al. | |
| 2007/0226807 A1* | 9/2007 | Ginter et al. | 726/27 |

(Continued)

FOREIGN PATENT DOCUMENTS

| | | | | |
|---|---|---|---|---|
| EP | 1320015 | | 6/2003 | |
| JP | 2004213711 | * | 7/2004 | G11B 20/10 |

(Continued)

OTHER PUBLICATIONS

International Search Report for International Application No. PCT/IL08/01680 mailed Apr. 20, 2009.

*Primary Examiner* — Harunur Rashid
(74) *Attorney, Agent, or Firm* — Eitan, Mehulal & Sadot

(57) ABSTRACT

A system and method for storing information on a storage device. An encrypted version of the information is stored on a storage device. The information is inspected in order to determine whether it may be stored on the storage device. If the information may be stored on the storage device then the stored encrypted version is decrypted, otherwise it is deleted.

17 Claims, 2 Drawing Sheets

(56) References Cited

U.S. PATENT DOCUMENTS

| | | |
|---|---|---|
| 2007/0266444 A1 | 11/2007 | Segal |
| 2008/0010682 A1* | 1/2008 | Hamid ............................ 726/24 |
| 2008/0243914 A1* | 10/2008 | Prahlad et al. ........... 707/103 Y |
| 2008/0305802 A1* | 12/2008 | Barnes et al. ................ 455/445 |
| 2009/0328033 A1* | 12/2009 | Kohavi et al. .................... 718/1 |

FOREIGN PATENT DOCUMENTS

| | | |
|---|---|---|
| WO | WO 99/48238 | 9/1999 |
| WO | WO 2007/135672 | 11/2007 |

* cited by examiner

SYSTEM AND METHOD FOR SECURELY STORING INFORMATION

CROSS-REFERENCE TO RELATED APPLICATIONS

This application is a National Phase Application of PCT International Application No. PCT/IL2008/001680, entitled "System and Method for Securely Storing Information", International Filing Date Dec. 25, 2008, published on Jul. 9, 2009 as International Publication No. WO 2009/083970, which in turn claims priority from U.S. Provisional Patent Application No. 61/016,855, filed Dec. 27, 2007, both of which are incorporated herein by reference in their entirety.

BACKGROUND OF THE INVENTION

A large and increasing portion of the information handled in today's modern office environment is digital. Many organizations, institutions and establishments store, handle and manipulate most of their information, and/or information associated with their activities, in digital forms. In many cases, such information may include confidential, secret or otherwise sensitive information, which, in the wrong hands, may cause serious damage to the owner or keeper of the information and/or to those associated with the owner or keeper of the information.

Uncontrolled information flow, also known as information leakage, is a recognized problem in various industries, organizations and environments. For example, commercial organizations, government agencies, academic institutions and health care facilities may all be at risk of sensitive information being leaked or otherwise provided to unauthorized, possibly hostile entities. Information leakage may be attributed to malicious activities as well as to human errors, such as, for example, negligence or loss of a device.

Much attention has been devoted to devising methods for preventing sensitive information from being copied to, or stored on, removable or other devices by inspecting the information being copied prior to actually copying or storing it on the target device. However, one drawback of such methods is that they interfere with operating systems constraints and may jeopardize their stability.

SUMMARY OF EMBODIMENTS OF THE INVENTION

Embodiments of the invention may enable an owner of information to control or limit the distribution of sensitive information. According to embodiments of the invention, information may be encoded, encrypted or otherwise converted to a modified form prior to being copied, for example, to an external device such as a personal digital assistant, a mobile phone, a smart phone, a digital camera, a MP3/MP4 player, an entertainment device, a personal computer, a remote computer over a wired or wireless network, or even duplicated on the same computer or device. According to embodiments of the invention, some or all of the encoded and/or encrypted information may be decoded or otherwise converted into useful or usable form only after a validation that the operation performed on the information is allowed and/or authorized.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
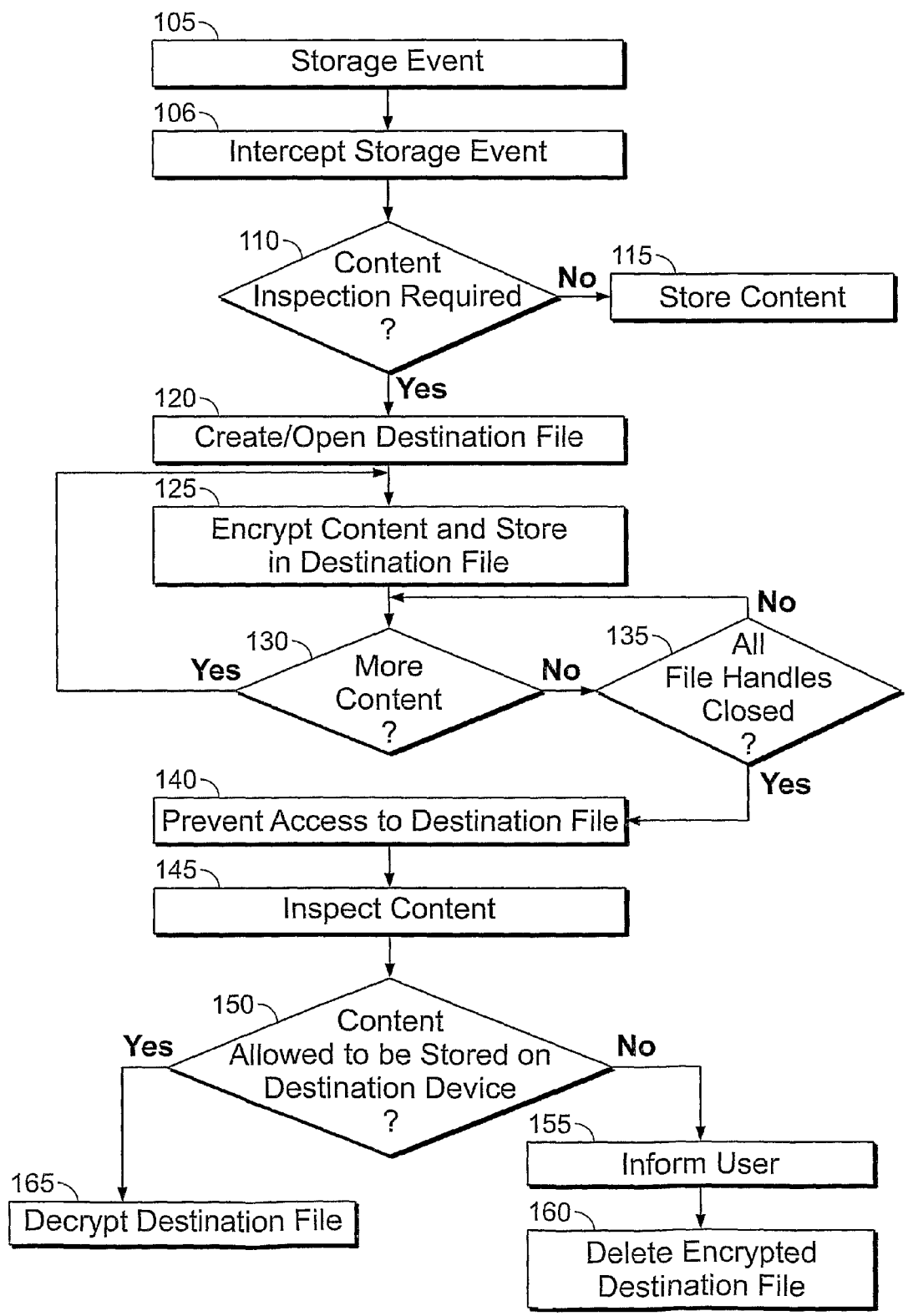
FIG. 1 is a schematic flow chart according to embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Unless explicitly stated, the method embodiments described herein are not constrained to a particular order or sequence. Additionally, some of the described method embodiments or elements thereof can occur or be performed at the same point in time.

According to embodiments of the invention, operations involving storing of digital content may be intercepted. According to embodiments of the invention, instead of storing the digital content, an encrypted or otherwise converted version of the original content may be stored. The content may further be examined, for example, in order to determine whether it contains sensitive material. If the outcome of an examination indicates that the content may indeed be copied and/or stored on the destination device and/or the destination location, then the converted or encrypted version of the content may be decrypted or otherwise converted back to its original form and/or format or into a relevant usable form. According to some embodiments of the invention, if the outcome of an examination indicates that the content may not be copied and/or stored on the destination device and/or the destination location, then according to embodiments of the invention, the converted encoded or encrypted content may be deleted from storage.

According to embodiments of the invention, a user may be notified if an operation was aborted and/or prohibited.

Reference is made to FIG. 1 showing an exemplary flow chart according to embodiments of the invention. According to embodiments of the invention and as indicated by block 105, the flow may include a storage event. A storage event may be any event comprising storing or receiving a command to store digital content onto a storage device. The device associated with a storage event will hereinafter be referred to as the "destination device". A storage event may further be associated with a source device and source file or content as well as with a destination file. A source device may be the device from which the information being stored is read, and a source file may be the file from which the information being stored is read. Accordingly, a destination file may be the file to which the information or content being stored is written. A destination file is located on the destination device.

According to embodiments of the invention, content may be any digital content, such as, but not limited to, a plain text file, a formatted text file such as a Word™ document or an Adobe Acrobat™ PDF document, an executable file, an image, audio, video or multimedia file or any other storable digital information. According to embodiments of the invention, a storage device may be any device suitable for storing digital content. Several illustrative examples may be a hard drive or disk, a removable storage medium such as a compact disc, a universal serial bus (USB) storage device, a network storage device, a FLASH storage device, a random access memory (RAM), an electrically erasable programmable read-only memory (EEPROM a volatile storage chip, a dynamic RAM (DRAM), a synchronous DRAM (SDRAM) or a peripheral component interconnect (PCI) compatible storage device. It should be noted that in this application, the terms "storage", "storage device", "external storage", "external storage device", "external device with storage device", "external device with any of above storage" may be used interchangeably.

According to embodiments of the invention, a storage event may be associated with a storage device whenever digital content or information is being stored on the storage device. For example, the process of copying a file from device A to device B comprises a storage event associated with device B and a process of duplicating a file on device A comprises a storage event associated with device A. For the sake of simplicity, a storage event associated with device A will hereinafter be referred to as "storing on device A". According to embodiments of the invention, a storage event may be associated with processes other than moving or copying files or content but with, for example, file and/or content creation on a device. For example, a user may create content using a word processing application or a graphic application and further store the newly created content on a storage device, or a user may download content from the internet into her browser, edit the downloaded content and further store the edited content on a storage device.

According to embodiments of the invention and as indicated by block 106, a storage event may be intercepted. According to embodiments of the invention, such interception may be performed by a module configured to detect storage events. For example, a software module may be configured to detect and intercept events comprising reference to a storage device. According to embodiments of the invention, such events may be detected by detecting an invocation of a device driver. For example, an invocation of a device driver handling a hard disk drive, a device driver handling a removable media drive, a device driver handling a network interface card (NIC) or any device driver handling a device or interface that may be associated with storage.

According to embodiments of the invention and as indicated by block 110, the flow may include determining whether content inspection is required. According to embodiments of the invention, content inspection may be required for some storage devices while it may be skipped for other storage devices. For example, a system may be configured such that specific devices, device types, a group of devices or any devices that meet predefined criteria are considered safe storage, namely, content may be freely stored on them. For example, a system may be configured to allow any content type or specific content types to be stored on a local, possibly internal, disk in a user's computer. According to embodiments of the invention and as indicated by block 115, it may be determined that content may be freely stored on the destination device, and accordingly, storage may be resumed as shown by block 115.

According to embodiments of the invention and as indicated by block 120, the flow may include creating a destination storage place holder. According to embodiments of the invention, such place holder may be created in cases where a file or other content type to store the information does not already exist on the destination device. According to embodiments of the invention, if such file or other content type to store the information does exist then creation of a place holder as indicated by block 120 may be skipped. According to embodiments of the invention, a storage place holder type may be selected according to parameters such as, but not limited to, the content being stored, the source storage type, the identity or type of the destination storage device, the file system on the destination device or the operating system running on the device to which the destination device is attached. For example, a storage place holder may be a file, a volume, a partition, a tape or any other suitable storage entity. For the sake of brevity and clarity the term "file" will be used in this application to denote a stored content entity. According to embodiments of the invention, the destination file created may be created empty, namely, containing no information. According to embodiments of the invention, instead of creating the destination file with the name assigned to it by a user or application, the system may name the destination file such as to obscure its association with the source file or the source content. For example, a destination file name may be produced using a random name generator.

According to embodiments of the invention, a mapping between the actual name and the name assigned by the user or application is maintained by the system. Such mapping may be used by the system in order to enable access to the destination file. According to embodiments of the invention, a user may attempt to access the destination file, possibly using the name associated with the destination file by the user. In such case, the system may extract the actual name of the destination file and access it on behalf of the user. Such "behind the scenes" naming manipulation may enable users and/or applications to access the destination (encrypted) file as if it were actually copied to the destination device. According to embodiments of the invention, when the destination (encrypted) file is read, the system may decrypt the content being read prior to providing it to a user, application or any other entity reading the file.

According to embodiments of the invention and as indicated by block 125, the flow may include encrypting content and storing the encrypted content in the destination file (place holder). For example, if the storage event is associated with copying of a file (the source file) from device A to a file (the destination file) on device B then the content from the source file may be read and encrypted, the encrypted content may further be stored in the destination file.

It should be noted that encryption according to embodiments of the invention and this application should be expansively construed to include any cryptographic operations, conversions. Transformations or manipulations performed on, or in association with, content. Such operations may render the content unusable for ordinary applications and/or consumers. For example, encryption may mean encoding, scrambling, reordering or otherwise relocating of bits, bytes, words, sections or paragraphs comprising a document or content. Other examples may be data obfuscation or a changing of values of various elements comprising a content, for example according to a, possibly secret, pattern or key. It should further be noted that decryption in this application should be expansively construed to include any operation required in order to undo an encryption applied to a content.

According to embodiments of the invention and as indicated by block 130, the flow may include checking whether new content is available. For example, new content may be added to the source file by a user writing to the source file or, for example, appending another file to the source file. According to embodiments of the invention, encryption of a source file may be performed while the source file is being modified. For example, encryption may be performed while the file is being edited. According to embodiments of the invention, a record may be kept to in order to track encryption progress. For example, a reference to disk sectors containing information already encrypted may be logged by the system. Such tracking may enable the system to ascertain that all content contained in a file is encrypted. Furthermore, tracking may enable the system to determine whether additions or modifications to the source file require a repetition of the encryption process for various sections.

According to embodiments of the invention and as indicated by block 135, the flow may include checking whether all file handles are closed and/or released. The term "file handle" should be expansively construed to include any information structures or context reflecting a state of a file. Typically, a file handle is provided by an operating system upon an initial access to a file or resource, a file handle may, among other functionalities, be used as reference to a specific file or resource. File handles may be in possession of an operating system, an application, a file system or any other related entity or module. As known in the art, in order to read, write, modify or otherwise manipulate a file, a file handle is required. A file handle may also reflect the state of the file. According to embodiments of the invention and as shown in FIG. 1, the system may wait for additional input as long as the file handles associated with the source file are not closed and/or released by the entities or modules that are in possession of such file handles. It should be noted that, according to some embodiments of the invention, more than one entity may be modifying the source file while the system is encrypting it.

According to embodiments of the invention and as indicated by block 140, the flow may include a limiting of access to the source and/or destination files. According to embodiments of the invention, such limitation may be imposed in order to verify that the files are not modified during an inspection process that may follow. According to embodiments of the invention, the limitation may disable specific actions related to the source and/or destination files. For example, a read operation may be allowed while a write, delete, concatenate or move operations may be disabled.

According to embodiments of the invention and as indicated by block 145, the flow may include an inspection and/or examination of the source file. According to embodiments of the invention, content examination or inspection may comprise searching for information according to a criteria. For example, inspection or examination may be the process of searching for sensitive or secret information. In such case, criteria may be defined such that sensitive or secret information may be identified. According to embodiments of the invention, inspection criteria information may be provided by an administrative body in the organization. According to embodiments of the invention, rules and definitions according to which content is examined may be stored locally, for example on a user's computer or centrally, for example on a server. According to embodiments of the invention, an examination of content may comprise searching for predefined text or text strings. According to embodiments of the invention, content examination may further comprise examining meta-data associated with the content. According to embodiments of the invention, meta-data associated with content may be parameters or information such as, but not limited to, a file name, a creation date, a modification date, an ownership, size, or associated applications. According to embodiments of the invention, various applications and technologies may be utilized during the process of examination of content, for example, optical character recognition (OCR) may be used for examining images. It will be noted that other methods and applications known in the art may be used for content inspection and/or examination without departing from the scope of the invention.

According to embodiments of the invention and as indicated by block 150, the flow may include determining whether the content may be stored on the destination device. According to embodiments of the invention, such determination may be based on the results of a content inspection and/or examination as described above and on information or parameters such as, but not limited to, the destination device and/or the user performing the storage. According to embodiments of the invention, a policy and/or rules repository may store and provide the system with input for the above determination process. For example, a policy may dictate that information pertaining to financial aspects of an organization may not be stored on removable devices, in such case, if the content at hand contains financial reports and the destination device is a detachable USB memory card then it may be determined that the content can not be stored on the destination device, namely, the file can not be copied as attempted.

According to embodiments of the invention, other rules, criteria and/or policies may govern content storage. Such policies, rules or criteria may involve information and parameters such as, but not limited to, specific users or user groups, device groups, device types, content types or nature or any other applicable and/or suitable information or parameters or criteria. For example, a time criteria or constraint may be applied, for example, prior to a release of a new product, during a specific time frame, a policy may dictate that information related to the new product may not be downloaded from a specific server or servers group to any storage device.

According to embodiments of the invention and as indicated by block 165, the flow may include decrypting of the destination file. According to embodiments of the invention, if the content may be stored on the target device then the encrypted content may be decrypted, possibly making the content on the destination device readily available for consumption. According to embodiments of the invention, the file name of the destination file on the destination device may also be changed to the intended name of the file, for example, the name assigned by the user performing the action or procedure that initiated the storage event.

According to embodiments of the invention and as indicated by block 155, the flow may include informing a user that the destination file is scheduled for deletion. According to embodiments of the invention informing the user may be accomplished by any suitable means such as, but not limited to visual and/or audio effects, for example, a message displayed on a computer display. According to embodiments of the invention, if it was determined that the content may not be stored on the destination device then the content may be deleted from the destination device. It should be noted that the content deleted at this stage is encrypted, namely, if the flow is aborted prior to deletion of the destination file, for example, by a user detaching the destination device or an electric power break or a hardware failure then information leakage may still be avoided.

According to embodiments of the invention and as indicated by block 160, the flow may include deletion of the destination file. According to embodiments of the invention, if the content may not be stored on the destination device then the destination file may be deleted.

Figure 2:
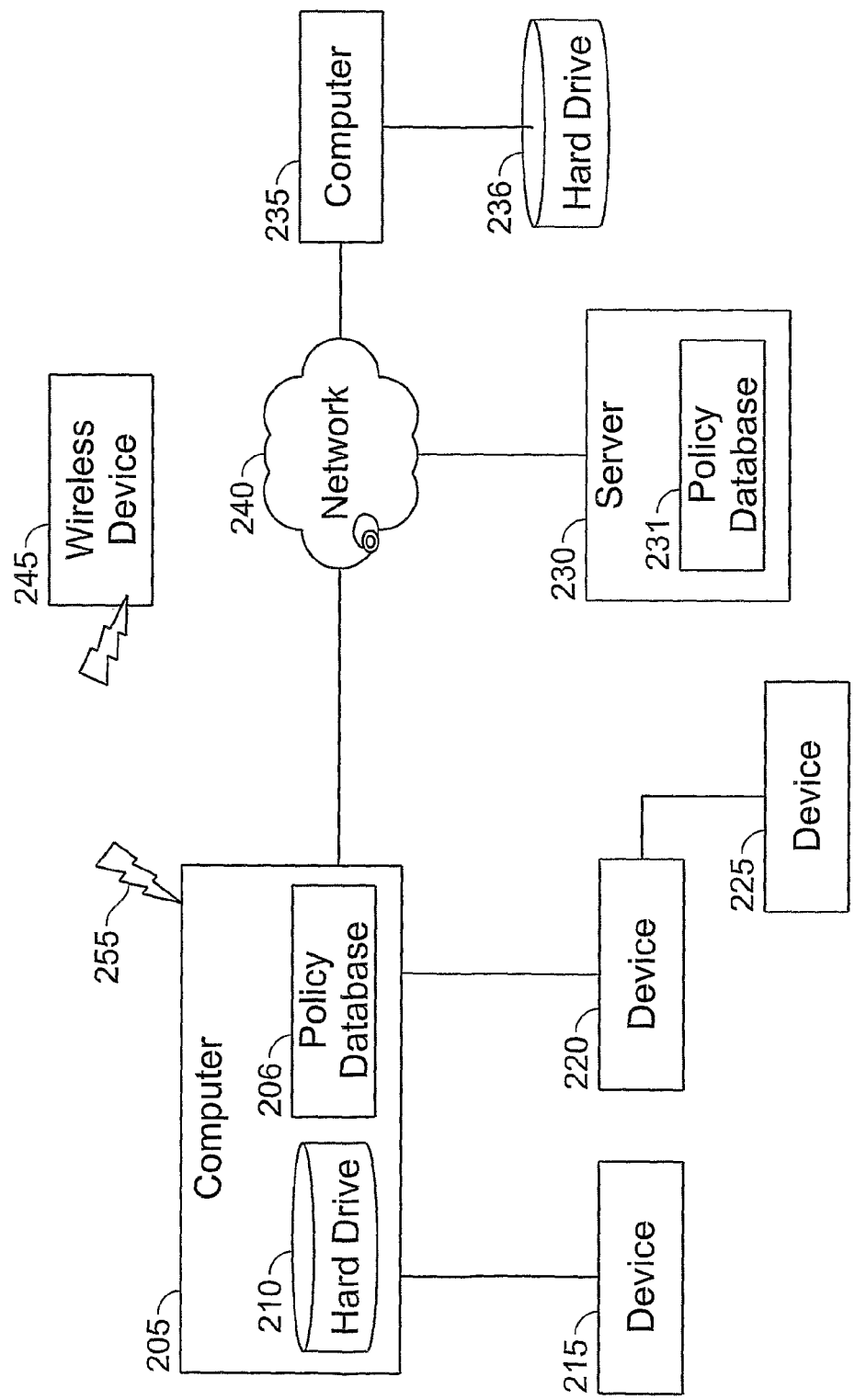
FIG. 2 is a schematic block diagram according to embodiments of the invention.

Reference is made to FIG. 2 showing exemplary components according to embodiments of the invention. According to embodiments of the invention, computers 205 and 235 may be a personal computer, a desktop computer, a mobile computer, a laptop computer, a notebook computer, a terminal, a workstation, a server computer, a personal digital assistant (PDA) device, a smart phone, a MP3/MP4 player, an entertainment device, a tablet computer, a network device, or other suitable computing device. Computer 205 may further include hard drive 210 that may be used to store information. Computer 205 may be further equipped with antenna 255. Antenna 255 may enable computer 205 to communicate wirelessly with wireless devices such as wireless device 245. Device 245 may be a computer similar to computers 205 and 235 or it may be a storage device, a cellular phone, a wireless personal digital assistant (PDA) device, or any other device capable of storing and/or providing digital information or content.

According to embodiments of the invention, computer 205 may be connected to one or more devices such as exemplary devices 215 and 220. According to embodiments of the invention, device 215 may be a volatile storage chip device, an external hard drive, a removable media device or drive, a USB storage device, a FLASH storage device, a peripheral component interconnect (PCI) compatible device or any other suitable device capable of storing and/or providing digital information. According to embodiments of the invention, device 220 may be similar to device 215. According to embodiments of the invention, device 220 may further include an operating system (OS) such as, but not limited to Windows CE™, Linux, Palm OS™, Solaris™, MAC OS™, a micro kernel or any other suitable OS. Device 220 may further be connected to device 225. According to embodiments of the invention, device 220 may transfer information to or from device 225.

According to embodiments of the invention, computer 205 may be connected to network 240. Network 240 may be a private IP network, an integrated services digital network (ISDN) line, a frame relay connection, a modem connected to a phone line or a public switched telephone network (PSTN), a public or private data network, a local area network (LAN), a metropolitan area network (MAN), a wide area network (WAN), an enterprise intranet or any other suitable communication means or combination of the preceding.

According to embodiments of the invention, server 230 may be a computer similar to computers 205 and/or 235 or it may be a network storage device. Server 230 may further be equipped to perform server duties. For example, server 230 may comprise extended storage and/or computing capacities. According to embodiments of the invention, policy database 206 may contain policies and rules that may be used as part of the process described below. According to embodiments of the invention, policy database 231 may contain policies and rules that may be used as part of the process described below. According to embodiments of the invention, policy database 231 may contain global policies and rules, for example policies that are applicable to all users in an organization while policy database may contain policies and rules that may be applicable to a specific user, for example, the user operating computer 205.

According to embodiments of the invention, content examination or inspection as described above may be performed according to policies, rules and/or other information. For example, policy database 206 and/or policy database 231 may store such information. According to embodiments of the invention, rules and policies according to which content inspection and examination may be performed may comprise information such as, but not limited to, file names and/or file types, device names, device types, device groups, locations on devices (e.g. specific folders) users and users privileges, encryption rules, test strings and topics. For example, policy databases 206 and/or 231 may contain a list of files which, according to an organization's policy may not be copied to removable devices. Or databases 206 and 231 may contain a list of files associated with a list of devices onto which the list of files may or may not be copied. Alternatively, databases 206 and 231 may contain a list of topics that, if mentioned in a document may prohibit the document from being copied to a removable device. For example, a company secretly negotiating a merger with another company may add a rule stating that documents containing the name of the other company may not be copied. Exemplary encryption rules may be rules that associate encryption types or levels with specific content types. For example, as oppose to ordinary content, top secret content may be encrypted by a method harder to decipher, but with higher computational demands.

According to embodiments of the invention, a user operating computer 205 may attempt to copy digital content from server 230. For example, the user may attempt to copy a text file, an image, or a video clip. Such copy may involve reading content from server 230, for example over network 240, and further storing the content on hard drive 210. According to embodiments of the invention, prior to being stored on hard drive 210, the content may be encrypted, the encrypted version may be stored on hard drive 210. According to embodiments of the invention, the content may further be examined. For example, the original content stored on server 230 may be examined. According to embodiments of the invention, if the examination indicates that the digital content contains no sensitive, or otherwise restricted information, then the encrypted version may be decrypted or otherwise converted to its original, pre-encrypted form. According to embodiments of the invention, if the examination indicates that the digital content contains information that may not be stored on computer 205 then the encrypted version stored in hard drive 210 may be deleted and the user operating computer 205 may be notified accordingly.

According to embodiments of the invention, a user operating computer 205 may attempt to copy digital content from hard drive 210 to device 215. According to embodiments of the invention, such copy procedure may be interrupted. According to embodiments of the invention, instead of storing the content on device 215, an encrypted, encoded or otherwise converted version of the content may be stored on device 215. According to embodiments of the invention, the content on hard drive 210 may next be examined. According to embodiments of the invention, based on the examination, it may be determined that the content may be copied to, or stored on device 215. In such case the encrypted content stored on device 215 may be decrypted and the operation may terminate. According to embodiments of the invention, if, based on the content examination and inspection described above it is determined that the content may not be copied to, or stored on device 215 then the encrypted version stored on device 215 may be deleted. According to embodiments of the invention, the user may be notified whether the copy operation terminated successfully or whether the operation was prohibited and consequently aborted.

According to embodiments of the invention, a user operating computer 235 may attempt to duplicate digital content on hard drive 236. For example, a user may attempt to copy a file from one location on disk 236 to another location on disk 236 or duplicate a file in the same location, possibly assigning it a different name. According to embodiments of the invention, a new file may be created in the destination location, but the content of the newly created file may be encrypted or otherwise converted as described above. According to embodiments of the invention, the content of the source file may be examined and/or inspected next. According to embodiments of the invention, if according to the inspection the file contains no information that prohibits it from being duplicated then the destination file may be decoded or otherwise converted back to its original form and/or format. According to embodiments of the invention, if the inspection finds that the file contains information that must not be duplicated then the duplicated file is deleted. According to embodiments of the invention, such embodiments may be useful for cases where classified information may only be stored in predefined locations or folders, possibly folders which are under supervision. In such cases it may be desirable to prohibit moving or copying such files to other locations, even on the same computer or storage device.

According to embodiments of the invention, a user operating and/or owning computer 205 may copy digital content from hard drive 210 or another storage device to device 220. As shown in FIG. 2, device 220 may be connected to device 225. Connection between device 220 and device 225 may be wired, such as, but not limited to, a USB connection, a serial connection or a parallel connection. Connection between device 220 and device 225 may be wireless, for example, a Bluetooth or a wireless fidelity (WiFi) connection. According to embodiments of the invention, a user operating device 220 may attempt to copy or transfer content from device 220 to device 225. For example content previously copied from computer 205 to device 220. According to embodiments of the invention, the copy or transfer operation may be intercepted. According to embodiments of the invention, an encrypted version of the content being copied or transferred may be stored on device 220. According to embodiments of the invention, the source content on device 220 may be examined and/or inspected as described above. According to embodiments of the invention, if the inspection of the content reveals that the content contains classified, or otherwise sensitive or secret information then the encrypted content stored on device 225 may be deleted, the user may be notified and the operation may be aborted or terminated. Alternatively, if according to the examination it is determined that the content may safely be stored on device 225 then the encrypted content stored on device 225 may be decrypted, consequently making it usable.

According to embodiments of the invention, file or content creation may be subjected to rules, policies or procedures as described above. For example, a user operating computer 205 may create a new file, for example using a word editor such as Microsoft Word™ or Adobe's Acrobat™. The user may attempt to save the newly created document on wireless device 245. According to embodiments of the invention, prior to saving (and storing) the file on device 245 the file may be encrypted. The file may further be examined. According to embodiments of the invention, temporary files used by the word editor may be used by the examination process. Similarly to procedures described above, if the examination process indicates that the file may be stored on device 245 then the encrypted file on device 245 may be decrypted. Alternatively, the file may be deleted. According to embodiments of the invention, accessing the file in order to either decrypt or delete it may be performed by utilizing underlying file systems and/or protocols, such utilization may be performed without departing from the scope of the invention.

According to embodiments of the invention, the content copied or transferred may be of substantial size, for example a file copied may be a few gigabytes in size. According to parameters such as, but not limited to, computational resources and/or level of inspection, the examination process may require more time than the user can or wishes to spend. According to embodiments of the invention, in such cases, a user may elect to detach the device on which the encrypted content was stored, for example, a USB memory chip or a PDA. According to embodiments of the invention, when the examination process ends, and provided it is determined that the content may be stored on the device, the user may be provided with a code, key or password required in order to restore the content to its original, usable form and/or format.

Storing information as described above may be unexpectedly interrupted, for example by a power surge or break. According to embodiments of the invention, a storage device containing information, the storage of which has been interrupted as described above, may be connected to a hosting device, e.g. a computer. According to embodiments of the invention, a connected device may be scanned for encrypted content. According to embodiments of the invention, encryption of encrypted files discovered on a device attached may resume from the logical point where it was interrupted.

For example, according to embodiments of the invention, a user may copy content from a network server to his laptop, detach his laptop from the network and possibly travel to a different, possibly distant location. It should be noted that the information stored on the user's laptop at this stage may be useless since it may be encrypted according to embodiments of the invention and as described above. According to embodiments of the invention, the examination and inspection process, which, as described above uses the source content, e.g. the content on the server, may proceed while the laptop is disconnected from the network. According to embodiments of the invention, upon termination of the examination process, and provided it is determined that the content may be copied to the user's laptop, the user may be provided with information required in order to restore or otherwise convert the content on the user's laptop to usable format. According to embodiments of the invention, such information may be a code, key, password or any other suitable information. According to embodiments of the invention, the information may be provided to the user by any suitable means, such as, but not limited to, email, mail, fax or automated answering system.

According to embodiments of the invention, parts or sections comprising a content segment or file may be allowed to be stored on a destination device while other parts or sections may not. For example, a file may contain both sensitive or secret information and information that may be freely circulated. According to embodiments of the invention, in such case the user may be informed that not all content stored on the target device will be available. For example, a user may be informed that pages 3, 6 and 17 in a document copied to his laptop from an organization server will not be available or readable.

According to embodiments of the invention, policies, rules and/or criteria used for determining whether a specific content may be stored on a specific device may further relate to file formats. For example, a rule may dictate that content related to various products may only be stored in an Acrobat™ PDF file. In such case, possibly following an inspection as described earlier, the destination file format may be decrypted as described above and, provided the original file format is other than PDF, may further be converted to an Acrobat™ PDF file format. In another embodiment of the invention, based on the determination of whether the information may be stored on the storage device, and if so, under what conditions the information may be stored, the information may be decrypted and stored as a modified version to include a watermark, for example, a visible watermark on a document, or an invisible watermark embedded in an image or in hidden code of a file.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
    intercepting an event of copying information from a source device, embedded in a computing system, to a destination storage device;
    determining whether or not content inspection is required for the information based on whether the storage device is removable from the computing system, wherein the determining comprises: if said destination storage device is a removable storage device, then determining that content inspection is required with regard to said information;
    if content inspection is required with regard to said information, then performing:
    (a) creating a storage place-holder on the destination storage device, wherein said storage place-holder is initially created empty and without holding information therein,
        wherein creating said storage place-holder on said destination storage device is performed on both (I) a file-system of the destination storage device, and (II) an operating system running on said computing system;
    (b) encrypting the information;
    (c) copying an encrypted version of said information from the source device to said destination storage device into a storage location indicated by said storage place-holder;
    (d) examining both (I) the content of the information, and (II) metadata associated with the information;
    (e) after copying said encrypted version of said information into said destination storage device, determining whether or not said information is authorized to be stored on said destination storage device,
        wherein the determining is dictated by a policy and is based on both (1) whether or not the destination storage device is removable, and (2) results of the content and metadata examination of step (d);
    (f) if said information is authorized to be stored on said destination storage device, then decrypting said encrypted version of said information which was temporarily stored at said storage place-holder in encrypted format on said destination storage device;
    (g) if the information is not authorized to be stored on said destination storage device, then deleting the encrypted version of the information that was temporarily stored at said storage place-holder on the destination storage device.

2. The method of claim 1, wherein determining whether or not said information is authorized to be stored on said destination storage device is further based, at least in part, on at least one parameter selected from the group consisting of:
    a parameter associated with said storage device,
    a parameter associated with said information,
    identification information pertaining to a user performing said storing.

3. The method of claim 1, wherein said metadata associated with said information are selected from the list of parameters consisting of:
    a file name, a file type, a file location, a file ownership, and a confidentiality classification of said information.

4. The method of claim 1, wherein said intercepting the event of copying information comprises identifying an attempt to save said information from a temporary memory to said destination storage device.

5. The method of claim 1, wherein said information is in an original representation format,
    wherein copying said encrypted version of said information into said destination storage device comprises converting said information from said original representation format to an alternate representation format based on said determining whether or not said information is authorized to be stored on said destination storage device, and storing said information in said alternate representation format into said destination storage device at said storage place-holder.

6. The method of claim 1, wherein said information is in an original representation format, and wherein said information is authorized to be stored on said destination storage device, and wherein the method further comprises: converting said information from said original representation format to an alternate representation format, and storing said information in said alternate representation format into said destination storage device at said storage place-holder.

7. The method of claim 1, when upon storing said information on said destination storage device, the method further comprises: modifying said information to include a watermark, and storing said modified information having said watermark on said destination storage device.

8. The method of claim 1, wherein determining whether or not content inspection is required for said information comprises:
    if the destination storage device is a removable storage device, then determining that content inspection is required for said information; and if the destination storage device is embedded in the computing system, then determining that content inspection is not required for said information.

9. The method of claim 1, wherein creating said storage place-holder on said destination storage device is performed by utilizing a random name generator that randomly generates a random destination file-name.

10. The method of claim 1, wherein the method comprises:
if said information is not authorized to be copied to said destination storage device, then storing said information at said storage place-holder in encrypted format;
if said information is authorized to be copied to said destination storage device, then storing said information at said storage place-holder in decrypted format that is readily available for consumption.

11. The method of claim 1, comprising:
during said content inspection, examining whether or not said information, that is the subject of the copying event to the destination storage device, includes a particular word that is defined in a rule;
if said information, that is the subject of the copying event to the destination storage device, includes said particular word that is defined in said rule, then determining that the information is not authorized to be copied to said destination storage device.

12. The method of claim 1, comprising:
during said content inspection, performing Optical Character Recognition (OCR) on an image that is included in said information; and then examining whether or not said information, that is the subject of the copying event to the destination storage device, includes a particular text string that is defined in a rule;
if said information, that is the subject of the copying event to the destination storage device, includes said particular text string that is defined in said rule, then determining that the information is not authorized to be copied to said destination storage device.

13. The method of claim 1, comprising:
during said content inspection, examining whether or not said information, that is the subject of the copying event to the destination storage device, is associated with a particular file owner that is pre-defined in a rule;
if said information, that is the subject of the copying event to the destination storage device, is associated with said particular file owner that is pre-defined in said rule, then determining that the information is not authorized to be copied to said destination storage device.

14. The method of claim 1, wherein encrypting said information comprises:
encrypting information from a source file while the source file is being modified or edited by a user;
keeping a record to track encryption progress, wherein the record refers to disk sectors containing information that was already encrypted.

15. The method of claim 1, wherein encrypting said information comprises:
encrypting information from a source file while the source file is being modified or edited by a user;
keeping a record to track encryption progress, wherein the record refers to disk sectors containing information that was already encrypted;
performing repetition of an encryption process for one or more sections of the information if said record indicates that the source file was modified.

16. The method of claim 1, comprising:
if said destination storage device is detached from said computing device, prior to deletion of information that is not authorized to be copy, then said storage place-holder at said destination storage device keeps storing encrypted data that is not readily available for consumption.

17. A system comprising:
a hardware processor configured to perform the following operations:
intercepting an event of copying information from a source device, embedded in a computing system, to a destination storage device;
determining whether or not content inspection is required for the information based on whether the storage device is removable from the computing system, wherein the determining comprises: if said destination storage device is a removable storage device, then determining that content inspection is required with regard to said information;
if content inspection is required with regard to said information, then performing:
(a) creating a storage place-holder on the destination storage device, wherein said storage place-holder is initially created empty and without holding information therein,
wherein creating said storage place-holder on said destination storage device is performed on both (I) a file-system of the destination storage device, and (II) an operating system running on said computing system;
(b) encrypting the information;
(c) copying an encrypted version of said information from the source device to said destination storage device into a storage location indicated by said storage place-holder;
(d) examining both (I) the content of the information, and (II) metadata associated with the information;
(e) after copying said encrypted version of said information into said destination storage device, determining whether or not said information is authorized to be stored on said destination storage device,
wherein the determining is dictated by a policy and is based on both (1) whether or not the destination storage device is removable, and (2) results of the content and metadata examination of step (d);
(f) if said information is authorized to be stored on said destination storage device, then decrypting said encrypted version of said information which was temporarily stored at said storage place-holder in encrypted format on said destination storage device;
(g) if the information is not authorized to be stored on said destination storage device, then deleting the encrypted version of the information that was temporarily stored at said storage place-holder on the destination storage device.

* * * * *